Figure 1:
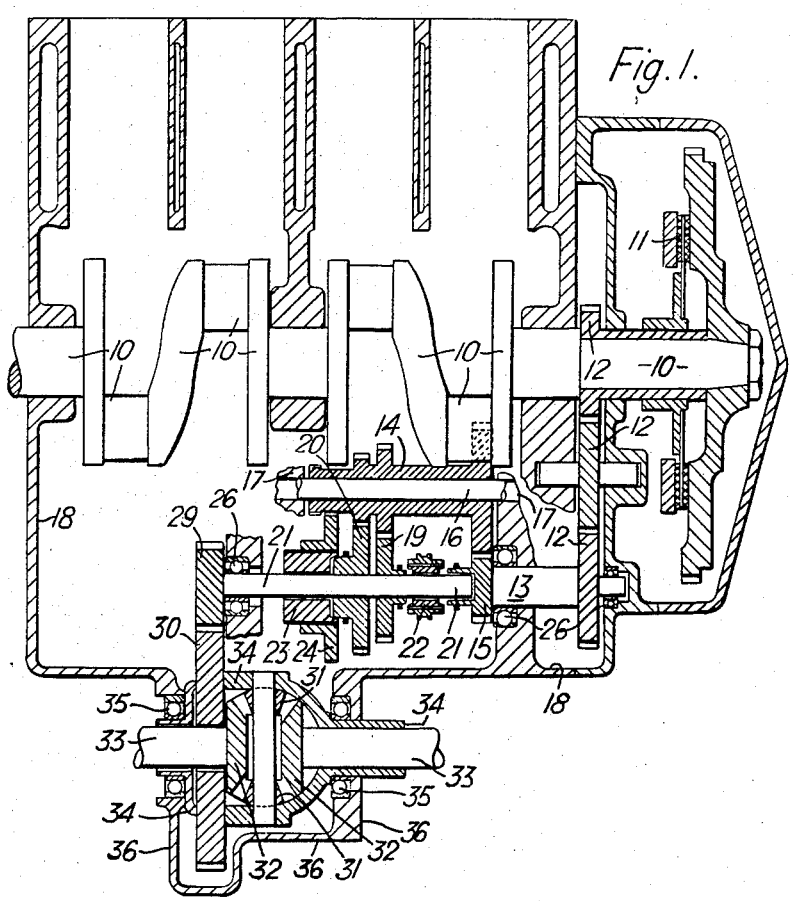

Nov. 24, 1959  A. A. ISSIGONIS  2,913,927

MOTOR VEHICLE POWER PLANTS

Filed April 28, 1958  2 Sheets-Sheet 1

Inventor
Alexander A. Issigonis

By: Scrivener and Parker,
Attorneys

Nov. 24, 1959  A. A. ISSIGONIS  2,913,927
MOTOR VEHICLE POWER PLANTS
Filed April 28, 1958  2 Sheets-Sheet 2

Inventor
Alexander A. Issigonis
By: Scrivener and Parker,
Attorneys

United States Patent Office 2,913,927
Patented Nov. 24, 1959

2,913,927

MOTOR VEHICLE POWER PLANTS

Alexander A. Issigonis, Oxford, England, assignor to The Austin Motor Company Limited, Birmingham, England Application April 28, 1958, Serial No. 731,345

Claims priority, application Great Britain June 11, 1957

2 Claims. (Cl. 74—701)

This invention relates to power plants suitable for motor vehicles with either a front engine and front wheel drive or a rear engine and rear wheel drive, said power plants being of the kind comprising in combination as a unit, or as a unitary assembly, an internal combustion engine, a clutch, a change-speed gear driven by the engine, and a differential gear which is driven by the change-speed gear and from the output shafts of which the road wheels are driven.

With power units or assemblies of this kind it is desirable that the moment of inertia about the axis of the differential, or the centre line of the driven road wheels should be kept as low as possible and, to this end, it has previously been proposed in a power unit or assembly of this kind to employ a horizontal cylinder engine with the change-speed gearing and differential gear closely adjacent or alongside the engine and arranged directly one above the other, the engine crankshaft, change-speed gear input and output shafts, and the crown wheel or input shaft of the differential gear being parallel to one another and the unit or assembly being adapted to be mounted with the axis of the crankshaft across the vehicle.

A power unit or assembly of the kind referred to and according to the present invention is characterised in that the engine is a vertical cylinder engine and in that the input and output shafts of the change-speed gear and the crown wheel or input shaft of the differential gear which are parallel to the engine crankshaft are mounted all to one side thereof in the engine crankcase or a lateral extension of the latter, the change-speed gear being disposed between the crankshaft and the differential gear.

The transmission between the engine crankshaft and the input shaft of the change-speed gear would, of course, include a clutch, and the said transmission and that between the output shaft of the change-speed gear and the crown wheel or input shaft of the differential gear may be afforded each by a simple reduction spur gear train or a chain and sprocket reduction drive.

The power unit or assembly would, of course, be adapted to be mounted with the engine crankshaft across the vehicle and with the engine in front of or behind the centre line of the driven road wheels. The employment of a vertical cylinder engine with the change-speed gear and differential gear disposed all to one side of the engine crankshaft and in the crankcase or a lateral extension thereof, lends itself to the design of a very compact unit or assembly with comparatively little overhang.

Figure 2:
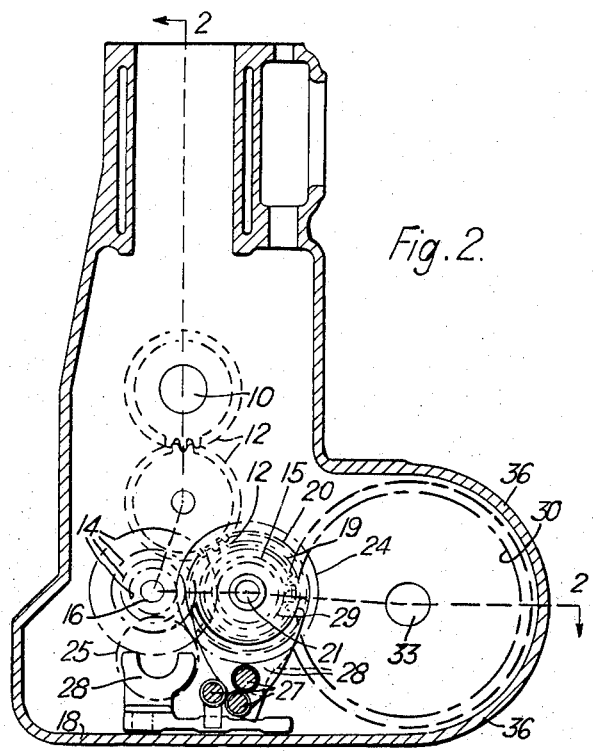

The invention will now be described with reference to the embodiment shown in the accompanying drawings; in which:

Fig. 1 is a sectional front elevation of so much of a motor vehicle power plant as is necessary for the understanding of the invention, the section being taken on the line 2—2 of Fig. 2 which is a fragmentary sectional end elevation of said power plant.

Referring to the drawings, the motor vehicle power plant comprises a vertical four-cylinder engine the crankshaft 10 of which drives, through a clutch 11 and a spur gear train 12, the input shaft 13 of a conventional type change-speed gear affording three forward speed ratios and reverse through a multiple layshaft pinion 14 which is constantly driven by an input shaft pinion 15.

The multiple layshaft pinion 14 rotates upon a spindle 16 fixed in bearings 17 in the crankcase 18 of the engine, and it is in constant mesh with the second gear pinion 19 and the third gear pinion 20 which are rotatable about the third motion or gear output shaft 21 to which they can be selectively coupled, said third motion shaft 21 being co-axially aligned with the input shaft pinion 15 and adapted to be coupled thereto for direct drive or top gear by a dog clutch element 22 of the gear shift mechanism. This dog clutch element 22 is slidably splined on the shaft 21 and can occupy a neutral position, as shown, or be shifted to couple either the input shaft pinion 15, for straight-through or top gear drive, or the pinion 19, for second gear drive, to said shaft 21. Another clutch element 23 is slidably splined upon said shaft 21 and in one extreme position it couples the third gear pinion 20 thereto, whilst in the other extreme position a reverse gear pinion 24 carried by said element 23 can be coupled through an intermediate pinion 25 to the multiple layshaft pinion 14 to drive the shaft 21 in reverse.

The axially aligned shafts 13, 21 are mounted rotationally in bearings 26 in the lower part of the crankcase 18, and the usual shift rods 27 which carry the forks 28 of the gear selector mechanism are mounted to slide in bearings in the bottom of the crankcase 18.

The third motion or gear output shaft 21 carries an output pinion 29 which is in constant mesh with the input shaft or crown wheel 30 of a differential gear comprising the usual planetary pinions 31 in mesh with axially opposed sun wheels 32 which drive the parts respectively of a divided axle 33, which axle parts 33 are mounted to rotate in bearings in a differential casing 34 which houses the sun wheels 32 and planetary pinions 31 and is mounted for rotation in bearings 35 in end wall portions of a lateral extension 36 of the crankcase 18.

As will be clearly seen, the axially aligned input and output shafts 13, 21 respectively of the change-speed gear and the input shaft or axis of the differential gear crown wheel 30 are parallel to the crankshaft 10 and are mounted all to one side thereof in the engine crankcase 18 and its lateral extension 36, the change-speed gear being disposed between the said crankshaft 10 and the differential gear which is accommodated almost wholly in said lateral extension 36 and beyond or further from the engine crankshaft 10 than the axially aligned input and output shafts 13, 21 respectively of the change-speed gear. The power unit or assembly is thus of general L shape in end elevation, the vertical limb being represented by the engine proper and the horizontal limb being represented by the crankcase 18 and its lateral extension 36 which contain the change-speed gear and differential gear with the latter more remote and with the change-speed gear between it and the engine crankshaft 10.

In order to reduce the overhang of the power unit or assembly, the axis or shaft 16 of the multiple layshaft pinion 14 of the change-speed gear is disposed on the side of the crankshaft 10 opposite to that of the aligned input and output shafts 13, 21 respectively.

The invention enables a very compact design of power unit or assembly to be obtained with very little overhang and with the differential gear disposed approximately centrally of its length so that if the power unit or assembly is mounted approximately centrally in the width of the vehicle and with the crankshaft axis across it, the differential gear will be approximately centrally disposed between the road wheels which are to be driven by the divided axle.

Having fully described my invention, what I claim and desire to secure by Letters Patent is:

1. A power unit comprising a vertical cylinder engine having a crank case and a crankshaft mounted therein, a change-speed gear having axially aligned input and output shafts, bearings in the crank case for mounting said axially aligned input and output shafts therein, means connecting the crankshaft and the input shaft, a differential gear having an input shaft connected with said output shaft, the input and output shafts of the change-speed gear and the input shaft of the differential gear being parallel to said crankshaft and mounted all to one side of the vertical axial plane thereof in the crank case, the change-speed gear being disposed between the crankshaft and the differential gear, a multiple-pinion layshaft mounted for rotation in the crankcase about an axis on the opposite side of the vertical axial plane of the crankshaft, and means connecting said axially aligned input and output shafts with said layshaft.

2. A power unit as set forth in claim 1 wherein the crankcase is provided with a lateral extension disposed substantially centrally of the length of the unit, and wherein the input shaft of the differential gear is mounted in bearings in said lateral extension and at a distance further from the vertical axial plane of the crankshaft than the output shaft of the change-speed gear.

References Cited in the file of this patent

UNITED STATES PATENTS

| | | |
|---|---|---|
| 926,797 | Williams | July 6, 1909 |
| 2,054,877 | Eastman | Sept. 22, 1936 |
| 2,090,123 | Hoffman | Aug. 27, 1937 |
| 2,123,005 | Ford | July 5, 1938 |
| 2,163,476 | Vincent | June 20, 1939 |

FOREIGN PATENTS

| | | |
|---|---|---|
| 430,930 | Italy | May 3, 1947 |